(12) United States Patent
Aoyama (10) Patent No.: US 9,126,144 B2
(45) Date of Patent: Sep. 8, 2015

(54) HONEYCOMB STRUCTURE

(71) Applicant: NGK Insulators, Ltd., Nagoya (JP)

(72) Inventor: Tomokatsu Aoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/298,027

(22) Filed: Jun. 6, 2014

(65) Prior Publication Data

US 2014/0363616 A1    Dec. 11, 2014

(30) Foreign Application Priority Data

Jun. 11, 2013 (JP) ................................. 2013-123243

(51) Int. Cl.
*B01D 46/24* (2006.01)
*C04B 38/00* (2006.01)
*B01D 53/74* (2006.01)

(52) U.S. Cl.
CPC ............ *B01D 53/74* (2013.01); *B01D 46/2462* (2013.01); *C04B 38/0006* (2013.01); *B01D 2046/2492* (2013.01); *F01N 2260/18* (2013.01); *F01N 2330/30* (2013.01); *Y10T 428/24149* (2015.01)

(58) Field of Classification Search
CPC ................................................... C04B 40/0295
See application file for complete search history.

(56) References Cited

U.S. PATENT DOCUMENTS

| | | | |
|---|---|---|---|
| 3,887,741 A * | 6/1975 | Dwyer ........................ | 428/116 |
| 5,895,700 A | 4/1999 | Yamada et al. | |
| 2002/0068025 A1* | 6/2002 | Foster et al. .................. | 422/179 |
| 2005/0129590 A1* | 6/2005 | Ichikawa ...................... | 428/116 |
| 2006/0105139 A1* | 5/2006 | Suwabe et al. ................ | 428/116 |
| 2008/0176029 A1* | 7/2008 | Ichikawa ...................... | 428/116 |
| 2014/0087080 A1* | 3/2014 | Fujioka et al. ................ | 427/355 |
| 2014/0087128 A1* | 3/2014 | Yanase et al. ................. | 428/116 |
| 2014/0087636 A1* | 3/2014 | Fujioka et al. ................. | 451/41 |
| 2014/0123612 A1* | 5/2014 | Yamada et al. ................ | 55/523 |

FOREIGN PATENT DOCUMENTS

JP       09-299811 A1    11/1997
JP       2001314718 A  *  11/2001

* cited by examiner

*Primary Examiner* — David Sample
*Assistant Examiner* — Nicholas W Jordan
(74) *Attorney, Agent, or Firm* — Burr & Brown, PLLC (57) ABSTRACT

There is disclosed a honeycomb structure in which a ring crack is not easily generated. A honeycomb structure includes a honeycomb substrate, and a bulging portion continuously or intermittently surrounding, in a ring shape, at least a part of an outer periphery of the honeycomb substrate. The outer periphery of the honeycomb substrate has one or a plurality of stress relaxing portions which are crevices each having an open end in the surface over a region of −5 to +10 mm or less from a reference bonded portion to a tapered surface, and a total of lengths of all the stress relaxing portions is 3% or more of a circumferential length of the honeycomb substrate.

9 Claims, 4 Drawing Sheets

HONEYCOMB STRUCTURE

The present application is an application based on JP-2013-123243 filed on Jun. 11, 2013 with Japan Patent Office, the entire contents of which are incorporated herein by reference.

BACKGROUND OF THE INVENTION

1. Field of the Invention

The present invention relates to a honeycomb structure. More particularly, it relates to a honeycomb structure in which a ring crack is not easily generated.

2. Description of Related Art

Heretofore, in an exhaust system of an exhaust gas, there has been mounted an exhaust gas purification device including a diesel particulate filter (DPF), a catalyst body, or the like. The DPF is a filter to trap a particulate matter (PM) mainly composed of soot. The catalyst body purifies harmful substances such as carbon monoxide (CO), hydrocarbons (HC) and nitrogen oxides ($NO_x$) included in the exhaust gas. Furthermore, a honeycomb structure is used as a catalyst carrier constituting this catalyst body or the DPF.

Figure 8:
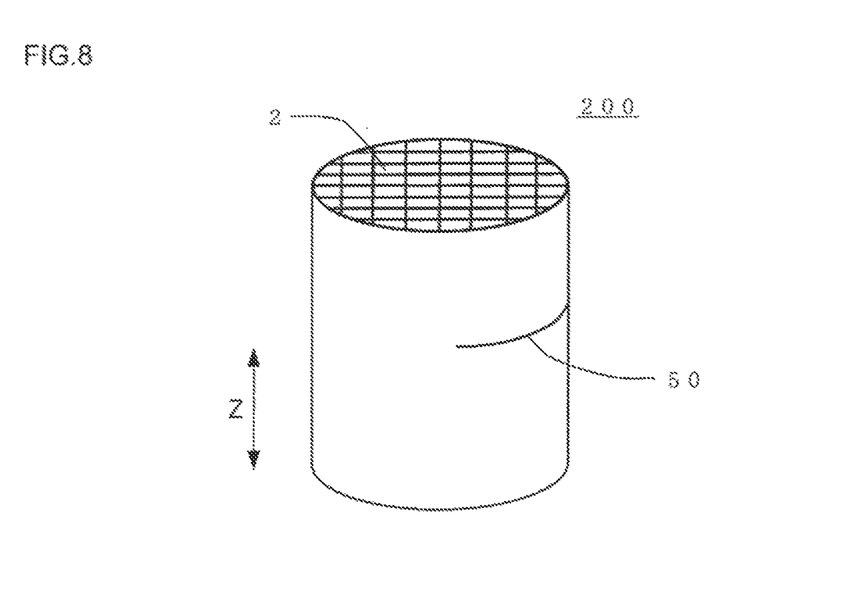
FIG. 8 is a perspective view schematically showing that a ring crack is generated in a conventional honeycomb structure.

One of causes for a failure of the exhaust gas purification device is, for example, generation of a ring-like crack in the honeycomb structure. Such a crack generated in the honeycomb structure will be referred to as "the ring crack". As shown in FIG. 8, this ring crack is a crack (a ring crack 50) formed substantially perpendicularly to an extending direction of cells 2 in a honeycomb structure 200. Furthermore, the ring crack 50 is formed to extend in a circumferential direction in an outer periphery of the honeycomb structure. FIG. 8 is a perspective view schematically showing a state where the ring crack is generated in the conventional honeycomb structure.

It is considered that a usual factor of this ring crack is generation of a tensile stress in the whole length direction (the cell extending direction) of the honeycomb structure. The tensile stress is a stress generated by a difference between a thermal expansion coefficient of a ceramic material which constitutes the honeycomb structure and a thermal expansion coefficient of a metal can body which stores this honeycomb structure. This tensile stress is generated when the honeycomb structure is placed in the environment where heating and cooling are repeated. There is a tendency that this tensile stress increases as a ratio (A/B) is large in which A is a length (the whole length (A)) of the honeycomb structure in the cell extending direction, and B is a diameter (the outer diameter (B)) of the honeycomb structure in a cross section perpendicular to the cell extending direction. Therefore, the larger the ratio A/B is, the more easily the ring crack is generated. Here, the whole length (A) is "the length in the cell extending direction" of the honeycomb structure. Furthermore, the outer diameter (B) is the diameter in "the cross section perpendicular to the cell extending direction" of the honeycomb structure.

Thus, as a method of inhibiting the generation of the ring crack, a method of enlarging the outer diameter to decrease the ratio A/B is known. Furthermore, there has been suggested a honeycomb structure in which the ratio A/B is in a predetermined range (e.g., see Patent Document 1).

[Patent Document 1] JP-A-H09-299811

SUMMARY OF THE INVENTION

However, in a honeycomb structure, a degree of difficulty in production rises as an outer diameter increases. Furthermore, when the honeycomb structure is used as a catalyst carrier, an amount of a noble metal to be loaded increases as the outer diameter increases. Furthermore, the whole exhaust gas purification device enlarges as the outer diameter of the honeycomb structure increases. When the honeycomb structure is mounted in a car, a mounting space is a limited space such as a space closest to an engine or a space on a lower surface of a car body. Therefore, there has been a limit to the increase of the outer diameter of the honeycomb structure.

The present invention has been developed in view of the abovementioned problems. In the present invention, there is provided a honeycomb structure in which a ring crack is not easily generated.

According to the present invention, there is provided a honeycomb structure described as follows.

[1] A honeycomb structure including a honeycomb substrate having porous partition walls defining a plurality of cells extending from a first end face as one end face to a second end face as the other end face to become through channels for a fluid, and a bulging portion continuously or intermittently surrounding, in a ring shape, at least a part of an outer periphery of the honeycomb substrate, wherein the bulging portion is disposed to project outwardly from the outer periphery of the honeycomb substrate and to cover a part of the outer periphery of the honeycomb substrate, a shape of at least one end of the bulging portion is a tapered shape having a tapered surface which is a surface tilted to a bonded portion to the outer periphery, and in a cross section perpendicular to an extending direction of the cells, a maximum thickness of the bulging portion is from 1 to 20 mm, and in a cross section parallel to the cell extending direction, a width of the bulging portion is 1% or more of the whole length of the honeycomb substrate and a tilt angle which is an angle made between the tapered surface and the cell extending direction is 80 degrees or less, the outer periphery of the honeycomb substrate has one or a plurality of stress relaxing portions which are crevices each having an open end in the surface over a region of −5 to +10 mm or less from the bonded portion to the tapered surface, which is used as a reference for measurement (hereinafter reference bonded portion), and a total of lengths of all the stress relaxing portions is 3% or more of a circumferential length of the honeycomb substrate.

[2] The honeycomb structure according to the above [1], wherein the total of the lengths of all the stress relaxing portions is 10% or more of the circumferential length of the honeycomb substrate.

[3] The honeycomb structure according to the above [1] or [2], wherein the total of the lengths of the stress relaxing portions, in each of which a width of the open end is 10 μm or more, is 50% or more of the total of the lengths of all the stress relaxing portions.

[4] The honeycomb structure according to any one of the above [1] to [3], wherein the stress relaxing portions of 40% or more of the total of the lengths of all the stress relaxing portions are present in the region of −5 to +10 mm or less from the reference bonded portion to the tapered surface.

[5] The honeycomb structure according to any one of the above [1] to [4], wherein in the cross section parallel to the cell extending direction, the width of the bulging portion is from 1 to 80% of the whole length of the honeycomb substrate, and the tilt angle is from 10 to 80 degrees.

[6] The honeycomb structure according to any one of the above [1] to [5], wherein a part of the surface of the bulging portion is a flat portion which is a flat surface parallel to the cell extending direction.

[7] The honeycomb structure according to any one of the above [1] to [6], wherein the honeycomb substrate is made of at least one selected from the group consisting of cordierite, silicon carbide, mullite, aluminum titanate, and alumina.

[8] The honeycomb structure according to any one of the above [1] to [7], further including:

plugging portions which plug an open end on the side of the first end face of a first cell as each of predetermined cells of the plurality of cells and an open end on the side of the second end face of a second cell as each of the residual cells of the plurality of cells.

The honeycomb structure of the present invention includes the above "bulging portion", and hence a ring crack is not easily generated. Furthermore, in the honeycomb structure of the present invention, even when the above "bulging portion" receives an external force during conveyance or the like, defects such as chips are not easily generated in the above "bulging portion". Furthermore, the honeycomb structure of the present invention has "the stress relaxing portions", and hence the honeycomb structure has an excellent thermal shock resistance.

DETAILED DESCRIPTION OF THE INVENTION

Hereinafter, embodiments of the present invention will be described with reference to the drawings. The present invention is not limited to the following embodiments, and change, modification or improvement can be added without departing from the gist of the present invention.

Figure 1:
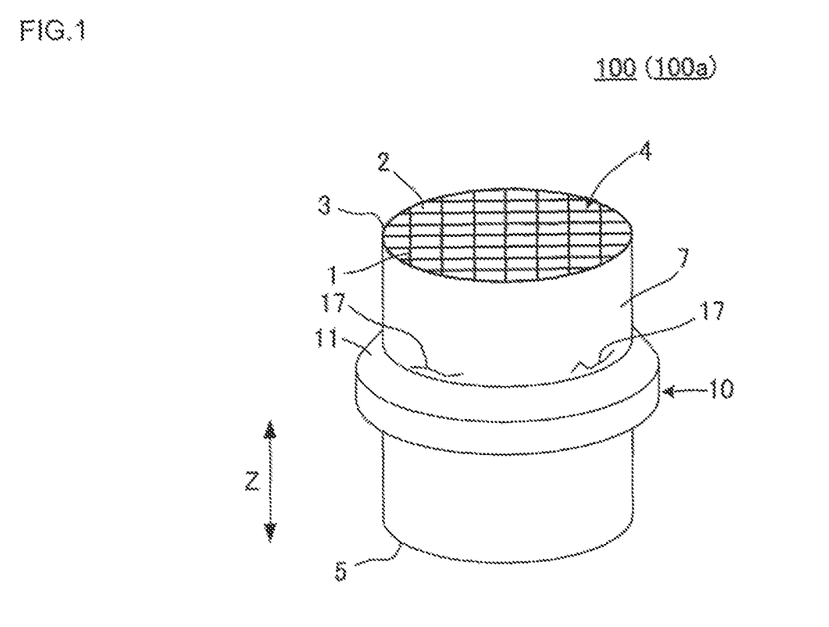
FIG. 1 is a perspective view schematically showing a honeycomb structure of one embodiment of the present invention.
Figure 2:
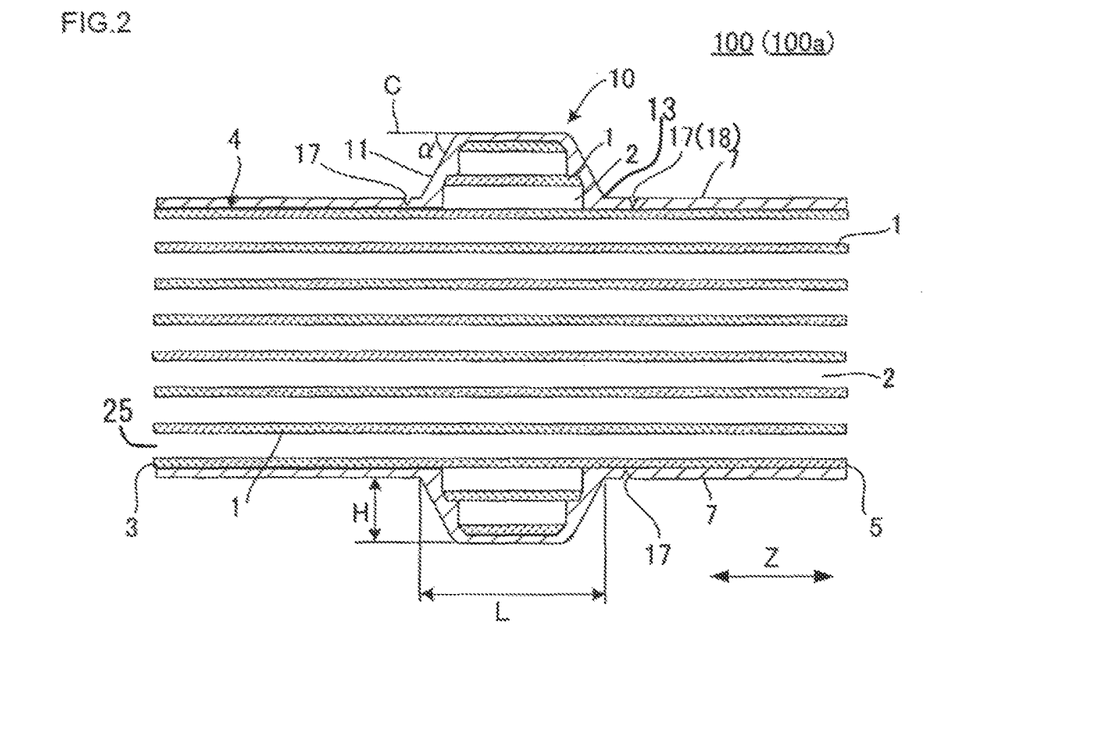
FIG. 2 is a schematic view showing a cross section parallel to an extending direction of cells of the honeycomb structure of the one embodiment of the present invention.

(1) Honeycomb Structure:

As shown in FIG. 1 and FIG. 2, a honeycomb structure 100a of one embodiment of the present invention includes a honeycomb substrate 4 and a bulging portion 10. The honeycomb substrate 4 has porous partition walls 1 defining a plurality of cells 2 extending from a first end face 3 as one end face to a second end face 5 as the other end face to become through channels for a fluid. The bulging portion 10 continuously or intermittently surrounds, in a ring shape, at least a part of an outer periphery of the honeycomb substrate 4. Furthermore, the bulging portion 10 is disposed to project outwardly from the outer periphery of the honeycomb substrate 4 and to cover a part of the outer periphery of the honeycomb substrate 4. A shape of at least one end of the bulging portion 10 is a tapered shape having a tapered surface 11 which is a surface tilted to a bonded portion 13 to the outer periphery. In a cross section perpendicular to an extending direction of the cells (hereinafter referred to simply as "a Z-direction"), "a maximum thickness H of the bulging portion 10" is from 1 to 20 mm. In a cross section parallel to the Z-direction, "a width L of the bulging portion 10" is 1%, or more of the whole length of the honeycomb substrate 4, and "a tilt angle" which is an angle made between the tapered surface 11 and the Z-direction is 80 degrees or less. The outer periphery of the honeycomb substrate 4 has one or a plurality of stress relaxing portions 17 which are crevices each having an open end in the surface over a region of −5 to +10 mm or less from the reference bonded portion 13 to the tapered surface 11. A total of lengths of all the stress relaxing portions 17 is 3% or more of a circumferential length of the honeycomb substrate 4. It is to be noted that FIG. 1 is a perspective view schematically showing the honeycomb structure 100a of the one embodiment of the present invention. FIG. 2 is a schematic view showing the cross section parallel to the Z-direction of the honeycomb structure 100a of the one embodiment of the present invention.

Here, "the tapered shape" is a shape in which an outer diameter of a ring shape decreases toward a tip. Furthermore, it can be considered that "the maximum thickness H of the bulging portion" is "a distance between 'a line parallel to the outer periphery of the honeycomb substrate disposed to come in contact with an outer periphery (other than a tapered portion) of the bulging portion' and 'the outer periphery of the honeycomb substrate' in the cross section parallel to the Z-direction of the honeycomb structure". Furthermore, when an outer periphery coating layer 7 is disposed on an outer peripheral surface of the honeycomb substrate 4, "the maximum thickness H of the bulging portion" is a thickness from the surface of the outer periphery coating layer as shown in Fig. 2.

The bulging portion 10 is disposed "to project outwardly from the outer periphery of the honeycomb substrate 4 and to cover a part of the outer periphery of the honeycomb substrate 4". That is, the outer diameter of a part of the honeycomb structure 100a is made larger. Therefore, in the honeycomb structure 100a, durability against a tensile stress is enhanced. As a result, in the honeycomb structure 100a, a ring crack is not easily generated even when the tensile stress is generated.

Furthermore, in the honeycomb structure 100a, the bulging portion 10 has "a ring shape continuously or intermittently surrounding at least a part of the outer periphery of the honeycomb substrate 4". Therefore, in the honeycomb structure 100a, the durability against the tensile stress is enhanced. The reason is that "at least a part of the outer periphery of the honeycomb substrate 4 is continuously and intermittently surrounded", whereby the tensile stress is uniformly applied. Consequently, even when the tensile stress is generated in the honeycomb structure 100a, the ring crack is not easily generated.

In the present description, "the circumferential length of the honeycomb substrate 4" means the circumferential length of the honeycomb substrate in a cross section vertical to the Z-direction.

"The stress relaxing portions 17" are crevices each having the open end 18 in the surface of the outer periphery of the honeycomb substrate 4. In the outer periphery of the honeycomb substrate 4, the stress relaxing portion 17 is present in the region of −5 to 10 mm or less from the reference bonded portion to the tapered surface 11, so that the tensile stress can be relaxed, and the ring crack is not easily generated. In particular, the total of the lengths of all the stress relaxing portions 17 is 3% or more of the circumferential length of the honeycomb substrate 4, and hence an inhibiting function of the ring crack by the stress relaxing portions 17 can be developed.

Furthermore, 40% or more of the total of the lengths of all the stress relaxing portions 17 are preferably present in the region of −5 to +10 mm or less from the reference bonded portion to the tapered surface 11. According to such a constitution, the present embodiment is excellent in that the tensile stress can more effectively be inhibited.

In the present description, in the case of "the region of −5 to 10 mm or less from the bonded portion 13 as the reference", "a positive numeric value" which defines the region means a direction from the bonded portion 13 toward the first end face 3 in the case of the bonded portion 13 between the tapered surface 11 on the first end face 3 side of the bulging portion 10 and the first end face 3 on the outer periphery of the honeycomb substrate 4, and the positive numeric value means a direction from the bonded portion 13 toward the second end face 5 in the case of the bonded portion 13 between the tapered surface 11 on the second end face 5 side of the bulging portion 10 and the second end face 5 on the outer periphery of the honeycomb substrate 4. Furthermore, "a negative numeric value" means a direction which is opposite to the direction from the bonded portion 13 toward the first end face 3 in the case of the bonded portion 13 between the tapered surface 11 on the first end face 3 side of the bulging portion 10 and the first end face 3 on the outer periphery of the honeycomb substrate 4, and the negative numeric value means a direction which is opposite to the direction from the bonded portion 13 toward the second end face 5 in the case of the bonded portion 13 between the tapered surface 11 on the second end face 5 side of the bulging portion 10 and the second end face 5 on the outer periphery of the honeycomb substrate 4.

There is not any special restriction on "a depth of the crevice" in each of the stress relaxing portions 17. When the outer periphery of the honeycomb substrate 4 is constituted of an outer periphery coating layer 7, "the depth of the crevice" of the stress relaxing portion 17 is preferably has such a degree that the crevice remains in the outer periphery coating layer 7 as shown in FIG. 2. When "the crevice" remains in the outer periphery coating layer 7, a structural strength of the honeycomb substrate 4 can be maintained.

In the honeycomb structure 100a, the total of the lengths of all the stress relaxing portions 17 is preferably 10% or more of the circumferential length of the honeycomb substrate 4. When the total of the lengths of all the stress relaxing portions 17 is 10% or more of the circumferential length of the honeycomb substrate 4, the tensile stress can be relaxed, and the ring crack further cannot be easily generated. Furthermore, the total of the lengths of all the stress relaxing portions 17 is more preferably 15% or more and especially most preferably from 25 to 90% of the circumferential length of the honeycomb substrate 4. When the total of the lengths of all the stress relaxing portions 17 is up to 90% of the circumferential length of the honeycomb substrate 4, the effect of inhibiting the ring crack can sufficiently be exerted. Furthermore, when the total of the lengths of all the stress relaxing portions 17 is 90% or less of the circumferential length of the honeycomb substrate 4, it is possible to suppress a manufacturing time of the stress relaxing portions (e.g., a drying time with an industrial dryer).

In the honeycomb structure 100a, a total of lengths of the stress relaxing portions 17 in each of which a width of the open end is 10 μm or more is preferably 50% or more of the total of the lengths of all the stress relaxing portions 17. When the total of the lengths of the stress relaxing portions 17 in each of which the width of the open end is 10 μm or more is 50% or more of the total of the lengths of all the stress relaxing portions 17, the tensile stress can be relaxed, and the ring crack further cannot easily be generated. Furthermore, the total of the lengths of the stress relaxing portions 17 in each of which the width of the open end is 10 μm or more is more preferably 55% or more and especially most preferably from 65 to 95% of the total of the lengths of all the stress relaxing portions 17. In the present description, "the width of the open end of the stress relaxing portion 17" is the width of the crevice which is measured along a direction vertical to an extending direction of the crevice in the surface of the outer periphery of the honeycomb substrate 4. When the total of the lengths of the stress relaxing portions 17 in each of which the width of the open end is 10 μm or more is up to 95% of the total of the lengths of all the stress relaxing portions 17, the effect of inhibiting the ring crack can sufficiently be exerted. Furthermore, when the total of the lengths of the stress relaxing portions 17 in each of which the width of the open end is 10 μm or more is 95% or less of the total of the lengths of all the stress relaxing portions 17, it is possible to suppress the manufacturing time of the stress relaxing portions (e.g., the drying time with the industrial dryer).

The maximum thickness H of the bulging portion 10 in the cross section perpendicular to the Z-direction is from 1 to 20 mm, preferably from 3 to 15 mm, and especially preferably from 3 to 10 mm. When the maximum thickness H of the bulging portion 10 in the cross section perpendicular to the Z-direction is smaller than 1 mm, the bulging portion is excessively thin, and hence the ring crack is generated to such an extent that a trapping function of a DPF is affected. When the thickness is in excess of 20 mm, the honeycomb structure cannot be mounted in a limited mounting space in a car or the like.

At least one end of the bulging portion 10 in the Z-direction is tapered. Therefore, even when the bulging portion 10 receives an external force during conveyance or the like, defects such as chips are not easily generated in the bulging portion 10.

In the cross section parallel to the Z-direction, "the tilt angle" which is the angle made between the tapered surface 11 and the Z-direction is 80 degrees or less. When "the tilt angle" is larger than 80 degrees, an end (the outermost circumference portion) of the bulging portion chips sometimes. "The tilt angle" is preferably from 10 to 80 degrees, and especially preferably from 20 to 60 degrees. When "the tilt angle" is smaller than 10 degrees, there is the disadvantage that the honeycomb structure 100a cannot be mounted in the limited mounting space in the car or the like. It is to be noted that "the tilt angle" is an acute angle α among the angles made between the tapered surface 11 and the Z-direction (see FIG. 2). "The tapered surface 11" is a tapered end face of the bulging portion 10.

The width L of the bulging portion 10 is 1% or more, preferably from 1 to 80%, and especially preferably from 5 to 20% of the length of the honeycomb structure 100a in the Z-direction (the whole length of the honeycomb substrate 4). When the width L of the bulging portion 10 is in the above range, the honeycomb structure can suitably be mounted in the limited mounting space in the car or the like. Furthermore, the bulging portion 10 is not excessively large, and hence the honeycomb structure 100a can be lightened. When the width L of the bulging portion 10 is smaller than 1%, there is a fear that the ring crack cannot suitably be prevented. Furthermore, when the width L of the bulging portion 10 is in excess of 80%, the honeycomb structure 100a enlarges, which causes a fear that the honeycomb structure 100a cannot be mounted in the limited mounting space in the car or the like. "The width L of the bulging portion 10" is a length of the bulging portion in the Z-direction. That is, "the width L of the bulging portion 10" is a distance between both tips of both the tapered ends.

There is not any special restriction on an arrangement position of the bulging portion 10 as long as the bulging portion is disposed to cover a part of the outer periphery of the honeycomb substrate 4. That is, the bulging portion may be disposed in a central portion or an end portion of the honeycomb substrate 4, as long as the generation of the ring crack can be prevented. The central portion of the honeycomb substrate 4 is the central portion of the honeycomb substrate 4 in the Z-direction. When cracks are easily generated in the central portion of the honeycomb substrate 4, the bulging portion 10 is preferably disposed in the central portion of the honeycomb substrate 4. When "the bulging portion 10 is disposed in the central portion of the honeycomb substrate 4", it is meant that "the bulging portion 10 is disposed so that at least a part of the bulging portion covers the center of the honeycomb substrate 4 in the Z-direction (the center of the honeycomb substrate 4)". That is, when "the bulging portion 10 is disposed in the central portion of the honeycomb substrate 4", the following two cases are included. That is, there are included both of the case where "the center of the bulging portion 10 in the Z-direction (the center of the bulging portion 10)" is superimposed on the center of the honeycomb substrate 4 (covers the center), and the case where a portion of the bulging portion 10 which is other than the center of the bulging portion is superimposed on the center of the honeycomb substrate 4 (covers the center). It is to be noted that in the honeycomb structure 100a, the crack (the ring crack) is easily generated in the center of the honeycomb substrate 4 as a ratio (A/B) between the whole length (A) and an outer diameter (B) increases.

In the honeycomb structure 100a, a crack (an end face crack) is easily generated in the end face of the honeycomb substrate 4 as the ratio (A/B) between the whole length (A) and the outer diameter (B) decreases. In particular, the end face crack is easily generated in the end face on an outlet side of an exhaust gas. As described above, when the crack is easily generated in the end face of the honeycomb substrate 4, the bulging portion 10 is preferably disposed in the end portion of the honeycomb substrate 4 having the end face in which the crack is easily generated.

The number of the bulging portions 10 is not limited to one, and can be plural. When the plurality of bulging portions 10 are disposed, the bulging portions 10 are preferably disposed in at least both of the end portion of the outlet side of the exhaust gas and the central portion.

As shown in FIG. 2, the bulging portion 10 preferably has the porous partition walls 1 defining the plurality of cells 2 parallel to the Z-direction. When the cells 2 are formed in the bulging portion 10, the honeycomb structure 100a can be lightened while preventing the generation of the ring crack. The bulging portion 10 is preferably formed integrally with the honeycomb substrate 4. In consequence, the bulging portion 10 can be firmly bonded to the honeycomb substrate 4. Here, when "the bulging portion 10 is formed integrally with the honeycomb substrate 4", the following is meant. That is, it is meant that the partition wall 1 of the bulging portion 10 is bonded to the partition wall 1 of the honeycomb substrate 4 so that a boundary is not present between the partition wall 1 constituting the bulging portion 10 and the partition wall 1 constituting the honeycomb substrate 4, and materials of the respective partition walls 1 are continuous. The honeycomb structure 100a in which "the bulging portion 10 and the honeycomb substrate 4 are integrally formed" in this manner can be obtained by forming one honeycomb formed body "including a portion which becomes the bulging portion 10 and a portion which becomes the honeycomb substrate 4", and then performing drying, firing, processing and the like. It is not necessary to load a noble metal which becomes a catalyst onto the partition walls 1 defining "the cells 2 formed in the bulging portion 10". This is because the exhaust gas does not easily flow into "the cells 2 formed in the bulging portion 10". A method of loading the catalyst onto the honeycomb structure 100a is preferably a method in which one end portion of the honeycomb structure 100a is immersed into a slurry for the catalyst, and the other end portion is sucked to suck up the slurry for the catalyst. According to this method, it is possible to easily prepare the honeycomb structure 100a in which the catalyst is not loaded onto "the cells 2 formed in the bulging portion 10".

The honeycomb structure 100a preferably includes the outer periphery coating layer 7 made of an outer periphery coating material on "an outer peripheral surface including the surface of the bulging portion 10" of the honeycomb substrate 4. The outer periphery coating layer 7 is included, so that it is possible to prevent leakage of the above slurry for the catalyst when the slurry for the catalyst is sucked up. Furthermore, as shown in FIG. 1 and FIG. 2, the outer periphery coating layer 7 is preferably formed to close open ends of "the cells 2 formed in the bulging portion 10". When the outer periphery coating layer 7 is formed to close the open ends of the "the cells 2 formed in the bulging portion 10", the exhaust gas allowed to flow into "the cells 2 formed in the bulging portion 10" can be prevented from being discharged from the open ends of "the cells 2 formed in the bulging portion 10". That is, it is possible to prevent the exhaust gas from leaking from the honeycomb structure 100a. As described above, the catalyst is not loaded onto the partition walls 1 defining "the cells 2 formed in the bulging portion 10" sometimes. In this case, when the outer periphery coating layer 7 is not formed as described above, the exhaust gas which is not sufficiently purified is discharged. That is, the leakage of the exhaust gas from the open ends of "the cells 2 formed in the bulging portion 10" causes a fear that a purification performance deteriorates. Thus, when the outer periphery coating layer 7 is formed to close the open ends of "the cells 2 formed in the bulging portion 10", the deterioration of the purification performance can be inhibited. The outer periphery coating material is obtained, for example, by adding additives such as an organic binder, a resin balloon and a dispersant to an inorganic raw material such as inorganic fibers, colloidal silica, a clay or SiC particles, and adding water thereto, followed by kneading.

A thickness of the outer periphery coating layer 7 is preferably from 1 to 5000 µm and especially preferably from 10 to 3000 µm. When the thickness of the outer periphery coating layer 7 is in the above range, drying after application of the outer periphery coating layer 7 can be performed in a uniform state. Therefore, it is possible to prevent the generation of "unintended cracks" in the outer periphery coating layer 7 after drying shrinkage. When the thickness of the outer periphery coating layer 7 is smaller than 1 µm, there is a fear that the slurry for the catalyst leaks from the honeycomb substrate 4 during the loading of the catalyst. When the thickness of the outer periphery coating layer 7 is in excess of 5000 µm, a ratio of a cross section of a portion which does not have an exhaust gas purifying function is large, and hence the purification performance deteriorates sometimes. A method of forming the crevices of the stress relaxing portions 17 is, for example, a method of intentionally generating the cracks in the outer periphery coating layer 7. "The unintended cracks" mentioned herein mean cracks which do not correspond to the crevices of the stress relaxing portions 17.

In the honeycomb structure 100a of the present embodiment, a material of the honeycomb substrate 4 preferably includes, as a main component, at least one selected from the group consisting of cordierite, silicon carbide, mullite, aluminum titanate, and alumina. Furthermore, the material of the honeycomb substrate 4 is further preferably constituted of at least one selected from the group consisting of cordierite, silicon carbide, mullite, aluminum titanate, and alumina. Here, "the main component" means a component in excess of 50 mass of the whole material.

In the honeycomb structure 100a of the present embodiment, an average pore diameter of the partition walls 1 is preferably from 5 to 100 μm and especially preferably from 8 to 50 μm. When the average pore diameter is smaller than 5 μm, a pressure loss is large sometimes. When the average pore diameter is larger than 100 μm, the strength of the honeycomb structure 100a is low sometimes. The average pore diameter is a value measured by a mercury porosimeter.

In the honeycomb structure 100a of the present embodiment, a porosity of the partition walls 1 is preferably from 25 to 80% and especially preferably from 35 to 75%. When the porosity is smaller than 25%, the pressure loss is large sometimes. When the porosity is larger than 80%, the strength of the honeycomb structure 100a is low sometimes. The porosity is a value measured by the mercury porosimeter.

A thickness of the partition walls 1 is preferably from 40 to 600 μm and especially preferably from 150 to 400 μm. When the thickness is smaller than 40 μm, the strength of the honeycomb structure 100a is low sometimes. When the thickness is larger than 600 μm, the pressure loss is high sometimes.

In the honeycomb structure 100a of the present embodiment, there is not any special restriction on a shape of the honeycomb substrate 4. The shape of the honeycomb substrate 4 is preferably a cylindrical shape, a tubular shape with elliptic end faces, or a polygonal tubular shape with end faces each having a polygonal shape such as "a square, rectangular, triangular, pentagonal, hexagonal, or octagonal shape". In the honeycomb structure 100a shown in FIG. 1, the shape of the honeycomb substrate 4 is the cylindrical shape.

In the honeycomb structure 100a of the present embodiment, there is not any special restriction on a cell shape (the cell shape in the cross section perpendicular to the Z-direction) of the honeycomb substrate 4. Examples of the cell shape include a triangular shape, a quadrangular shape, a hexagonal shape, an octagonal shape, a round shape, and any combination of these shapes. The quadrangular shape is preferably a square shape or a rectangular shape.

In the honeycomb structure 100a of the present embodiment, there is not any special restriction on a cell density of the honeycomb substrate 4. The cell density of the honeycomb substrate 4 is preferably from 15 to 200 cells/cm$^2$ and especially preferably from 30 to 100 cells/cm$^2$. When the cell density is smaller than 15 cells/cm$^2$, the pressure loss is large or the strength of the honeycomb structure 100a is low in a short time sometimes during the flowing of the exhaust gas. When the cell density is larger than 200 cells/cm$^2$, the pressure loss is large sometimes.

Figure 3:
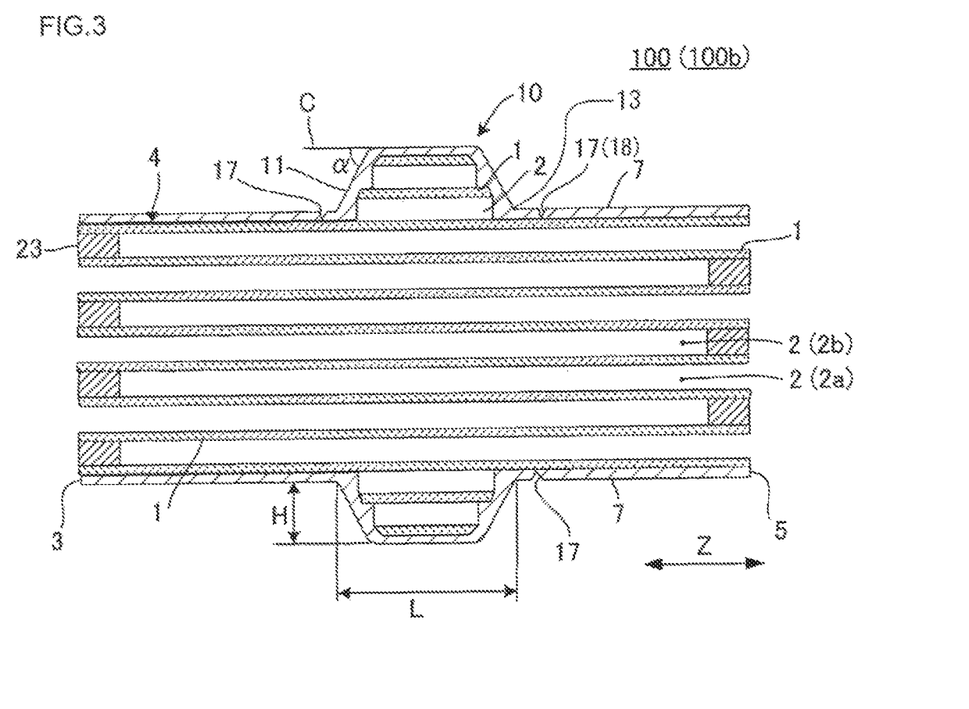
FIG. 3 is a schematic view showing a cross section parallel to an extending direction of cells of a honeycomb structure of another embodiment of the present invention.

FIG. 3 is a schematic view showing a cross section of a honeycomb structure 100b of another embodiment of the present invention, which is parallel to a Z-direction. The honeycomb structure of the present invention, as in the honeycomb structure 100b, may include plugging portions 23 disposed at open ends of predetermined cells (first cells 2a) in a first end face 3 and open ends of the residual cells (second cells 2b) in a second end face 5. The first cells 2a and the second cells 2b are preferably alternately arranged. Furthermore, in both the end faces of the honeycomb structure 100b, checkered patterns are preferably formed by the plugging portions 23 and "the open ends of the cells", thereby. A material of the plugging portions 23 is preferably a material considered to be preferable as the material of a honeycomb substrate 4 (partition walls 1). The material of the plugging portions 23 may be the same as the material of the honeycomb substrate 4, or different from the material of the honeycomb substrate 4.

Figure 4:
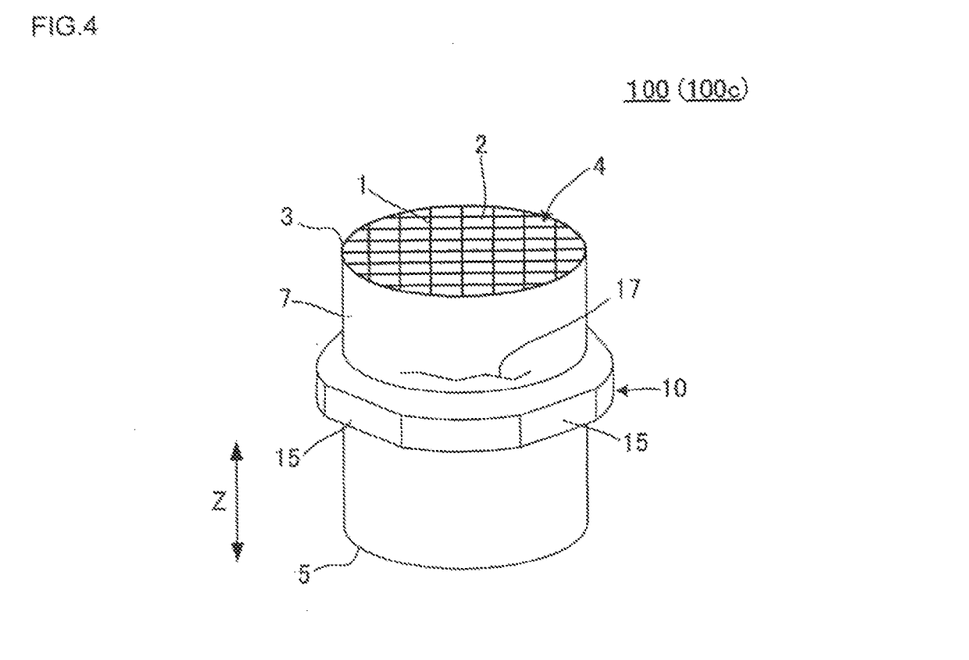
FIG. 4 is a perspective view schematically showing still another embodiment of the honeycomb structure of the present invention.
Figure 5:
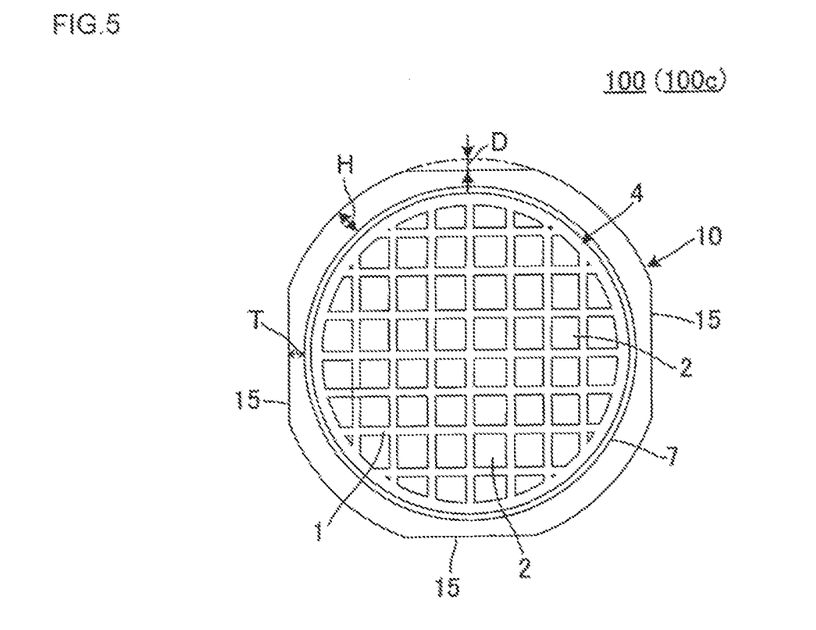
FIG. 5 is a plan view of the honeycomb structure shown in FIG. 4, which is seen from the side of a first end face.

In still another embodiment of the honeycomb structure of the present invention, as in a honeycomb structure 100c shown in FIG. 4, a part of the surface of the bulging portion 10 in the above one embodiment of the honeycomb structure of the present invention is a flat portion 15 which is a flat surface parallel to a Z-direction. The bulging portion 10 in which a part of the surface has a flat shape is included, whereby a maximum thickness H of the bulging portion 10 is partially thin (a thickness of the flat portion 15 is small). Therefore, as a package container for use during transfer of the honeycomb structure 100c, a small container can be used. FIG. 4 is a perspective view schematically showing the honeycomb structure 100c of this still another embodiment of the present invention. FIG. 5 is a plan view of the honeycomb structure 100c seen from a first end face.

In the honeycomb structure 100c, the bulging portions 10 preferably have a uniform shape in a peripheral direction in portions other than portions in which the flat portions 15 are formed. "The uniform shape in the peripheral direction" means that a shape of a cross section perpendicular to the peripheral direction is the same shape in any portion. It is to be noted that in the honeycomb structure 100c, the portions other than the portions in which the flat portions 15 are formed in the bulging portion 10 do not have to be formed into the uniform shape in the peripheral direction. Furthermore, in the one embodiment of the honeycomb structure of the present invention (the honeycomb structure 100a in which the flat portions are not formed in the bulging portion 10), the bulging portion 10 preferably has the uniform shape in the peripheral direction over the whole periphery. It is to be noted that in the above one embodiment (the honeycomb structure 100a) of the honeycomb structure of the present invention, the bulging portion 10 does not have to be formed into the uniform shape in the peripheral direction over the whole periphery.

Figure 6:
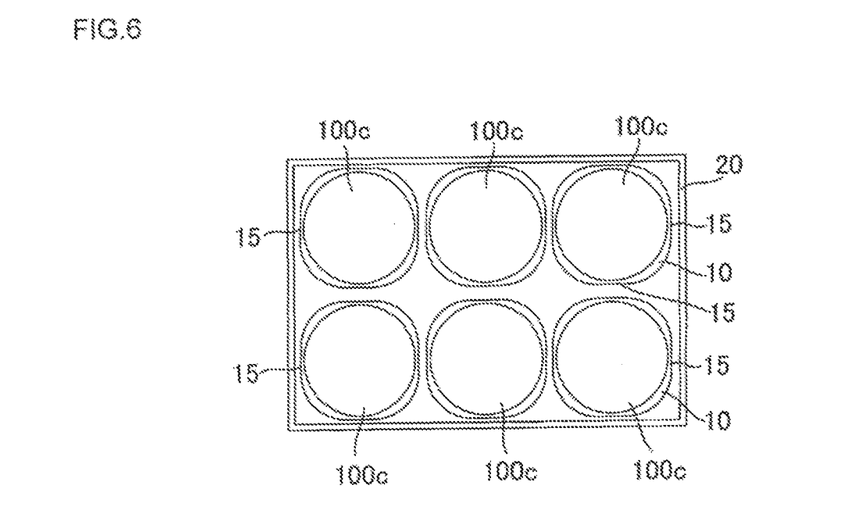
FIG. 6 is a plan view schematically showing that a plurality of honeycomb structures shown in FIG. 4 are stored in an existing package container.

In the honeycomb structure in which "a part of the surface of the bulging portion 10 is the flat portion 15" as in the honeycomb structure 100c shown in FIG. 5, the thickness of the bulging portion 10 is small in the flat portion 15. Therefore, as shown in FIG. 6, the honeycomb structures 100c can be stored in an existing package container 20, even when the package container is not designed in an especially large size for the presence of ring-like bulging portions. Therefore, the existing package container 20 can be used. In FIG. 6, partition walls of the honeycomb structures 100c are omitted. FIG. 6 is a plan view schematically showing that the plurality of honeycomb structures 100c are stored in the existing package container 20.

In the bulging portion 10, a pair of flat portions 15 parallel to each other are preferably formed. Furthermore, as shown in FIG. 5, two pairs of flat portions 15 parallel to each other are preferably formed in the bulging portion 10, and one pair of flat portions 15 is preferably formed perpendicularly to the other pair of flat portions 15. When the flat portions 15 are formed in this manner, thin portions (the flat portions 15) are formed in the bulging portion 10, and hence a storage space can be small as compared with a case where the flat portions 15 are not formed. Therefore, the honeycomb structure 100c can suitably be mounted even in a place where a mounting space is small as in a car or the like.

A distance (the shortest distance) T (see FIG. 5) between the flat portion 15 (the surface) and the outer periphery of the honeycomb substrate 4 (a portion covered with the bulging portion 10) is preferably from 1 to 15 mm and especially preferably from 2.5 to 10 mm. When the distance T between the flat portion 15 and the outer periphery of the honeycomb substrate 4 is in the above range, the generation of the ring crack can be prevented. Furthermore, even in the place where the mounting space is small as in the car or the like, the honeycomb structure 100c can suitably be mounted. It can be considered that the distance T between the flat portion 15 (the surface) and the outer periphery of the honeycomb substrate 4 is a thickness of the thinnest portion in the flat portion 15 of the bulging portion 10. It is to be noted that when the honeycomb structure 100c includes an outer periphery coating layer 7, the distance T is a value obtained by subtracting a thickness of the outer periphery coating layer 7 from the distance (the shortest distance) between the flat portion 15 (the surface) and the outer periphery of the honeycomb substrate 4.

Figure 7:
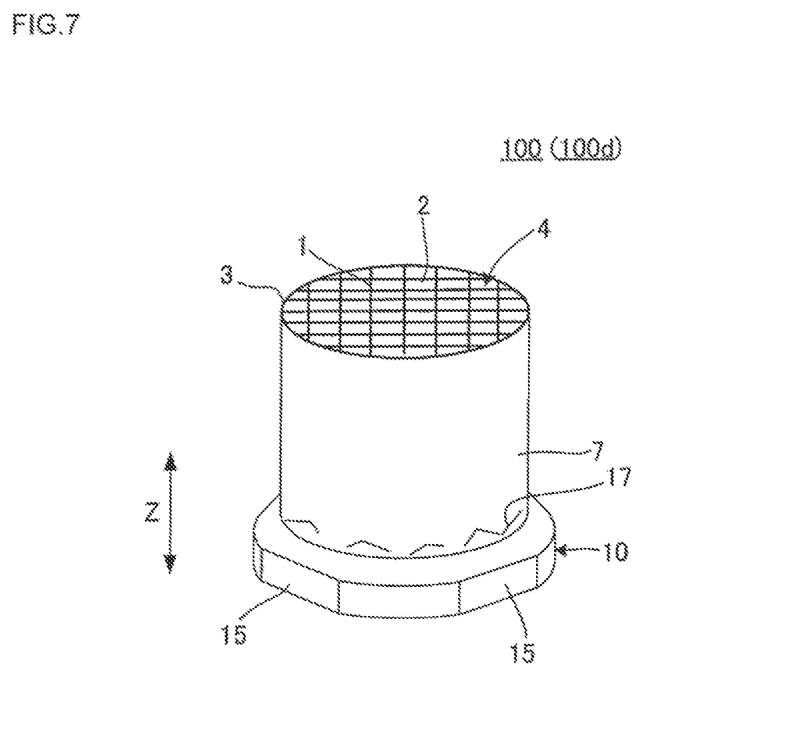
FIG. 7 is a perspective view schematically showing a further embodiment of the honeycomb structure of the present invention.

In a further embodiment (a honeycomb structure 100d) of the honeycomb structure of the present invention, the bulging portion 10 is disposed in an end portion (one end portion) of a honeycomb substrate 4 in the above other embodiment (the honeycomb structure 100c) of the honeycomb structure of the present invention. The honeycomb structure 100d shown in FIG. 7 is the further embodiment of the honeycomb structure of the present invention. As described above, the bulging portion 10 is disposed in the one end portion of the honeycomb structure 100d, whereby generation of an end face crack can be prevented. Furthermore, in the honeycomb structure 100d, stress relaxing portions 17 are also disposed in the vicinity of the one end portion. Therefore, by a function of the stress relaxing portions 17, the generation of the end face crack can be prevented. When the honeycomb structure is used as a DPF, the end face crack is generated in an end face on an exhaust gas outlet side sometimes. This end face crack is generated as follows. A large amount of soot included in the exhaust gas of an engine of a car or the like is deposited in the outlet-side end portion of the honeycomb structure. Therefore, when the soot or the like is burnt to recover the honeycomb structure, a temperature of the outlet-side end portion of the honeycomb structure is higher than other portions because of the burning of the soot or the like. In consequence, a stress is generated in the end portion of the honeycomb structure. As a result, a crack (the end face crack) is generated in the outlet-side end face of the honeycomb structure. FIG. 7 is a perspective view schematically showing this further embodiment of the honeycomb structure of the present invention.

(2) Manufacturing Method of Honeycomb Structure:

The honeycomb structure of the present invention can be manufactured by the following method. That is, the honeycomb structure of the present invention can be manufactured by a method having a honeycomb fired body preparing step of preparing a honeycomb fired body, and a cutting step of cutting an outer peripheral portion of this honeycomb fired body to form a bulging portion. Furthermore, when the honeycomb structure includes the outer periphery coating layer, the method preferably has an outer periphery coating layer forming step after the outer peripheral portion of the honeycomb fired body is cut. "The honeycomb fired body" is the honeycomb fired body including porous partition walls formed by firing a ceramic raw material, to define a plurality of cells which become through channels for a fluid.

According to such a method, the honeycomb structure of the present invention can easily be prepared.

When "a part of the surface of the bulging portion has the flat shape parallel to the Z-direction" (the flat portion is formed in the bulging portion), the honeycomb structure of the present invention can be manufactured by the following method. That is, the honeycomb structure "in which the flat portion is not formed in the bulging portion" is prepared. Afterward, a part of the bulging portion of this honeycomb structure is cut so that the flat portion is formed, whereby it is possible to manufacture the honeycomb structure in which the flat portion is formed in the bulging portion as shown in FIG. 1. Furthermore, when "a part of the surface of the bulging portion has the flat shape parallel to the Z-direction", the honeycomb structure of the present invention can be also manufactured by the following method. That is, the method has the above honeycomb fired body preparing step and the above cutting step, and in the above honeycomb fired body preparing step, the honeycomb fired body having a polygonal columnar shape is prepared. Furthermore, in the cutting step, the honeycomb fired body is cut so that a part of the side surface of the honeycomb fired body is left, and this left part of the side surface becomes the flat portion of the bulging portion. In this case, it is not necessary to perform an operation of forming the flat portion anew after the cutting step, and the manufacturing process can be rationalized.

Hereinafter, each step of the manufacturing method of the honeycomb structure of the present invention will be explained.

(2-1) Honeycomb Fired Body Preparing Step;

The honeycomb fired body preparing step is a step of preparing the honeycomb fired body including the porous partition walls formed by firing the ceramic raw material. There is not any special restriction on a method of preparing the honeycomb fired body. Hereinafter, the honeycomb fired body preparing step will be described in stages.

(2-1-1) Forming Step;

First, in the forming step, a ceramic forming raw material containing the ceramic raw material is preferably formed to obtain the honeycomb formed body including partition walls (unfired) defining the plurality of cells which become through channels for the fluid. The honeycomb formed body is a formed body of a honeycomb structure.

The ceramic raw material contained in the ceramic forming raw material is preferably at least one selected from the group consisting of a cordierite forming raw material, cordierite, silicon carbide, a silicon-silicon carbide based composite material, mullite, and aluminum titanate. It is to be noted that the cordierite forming raw material is a ceramic raw material blended to obtain a chemical composition in which silica is in a range of 42 to 56 mass %, alumina is in a range of 30 to 45 mass %, and magnesia is in a range of 12 to 16 mass %. Furthermore, the cordierite forming raw material is fired to become cordierite.

Furthermore, the ceramic forming raw material is preferably prepared by mixing the above ceramic raw material with a dispersant, an organic binder, an inorganic binder, a pore former, a surfactant or the like. There is not any special restriction on a composition ratio of each raw material, and the composition ratios are preferably set in accordance with a structure, a material or the like of the honeycomb structure to be prepared.

When the ceramic forming raw material is formed, the ceramic forming raw material is preferably first kneaded to obtain a kneaded material, and the obtained kneaded material is preferably formed into a honeycomb shape. There is not any special restriction on a method of kneading the ceramic forming raw material to form the kneaded material, and an example of the method is a method in which a kneader, a vacuum pugmill or the like is used. There is not any special restriction on a method of forming the kneaded material to obtain the honeycomb formed body, and a known forming method such as extrusion or injection molding can be used. An example of a suitable method is a method in which a raw material is extruded by using a die having a desirable cell shape, partition wall thickness and cell density to obtain the honeycomb formed body. A material of the die is preferably cemented carbide which does not easily wear away.

Examples of a shape of the honeycomb formed body include a columnar shape, an elliptic shape, and a polygonal columnar shape with end faces each having "a square shape, a rectangular shape, a triangular shape, a pentagonal shape, a hexagonal shape, or an octagonal shape". When the honeycomb structure including "the bulging portion in which the flat portion is formed" is manufactured, the honeycomb formed body having the polygonal columnar shape is preferably obtained. When a part of the polygonal columnar side surface is left, this left part of the side surface can be the flat portion of the bulging portion. That is, the operation of forming the flat portion can be omitted. The honeycomb formed body especially preferably has a quadrangular columnar shape.

Furthermore, after the above forming, the obtained honeycomb formed body may be dried. There is not any special restriction on a drying method. Examples of the method include hot air drying, microwave drying, dielectric drying, reduced pressure drying, vacuum drying, freeze drying, and the same. Among these methods, the dielectric drying, the microwave drying or the hot air drying is preferably performed alone, or any combination of these methods is preferably performed.

(2-1-2) Firing Step;

Next, the honeycomb formed body is fired to prepare the honeycomb fired body.

The honeycomb formed body is preferably calcinated before the honeycomb formed body is fired (the main firing). The calcinating is performed for degreasing. There is not any special restriction on a method of calcinating the honeycomb formed body, and any method can be used as long as organic materials (the organic binder, the surfactant, the pore former, etc.) can be removed. In general, a burning temperature of the organic binder is from about 100 to 300° C., and a burning temperature of the pore former is from about 200 to 800° C. Therefore, as calcinating conditions, heating is preferably performed at about 200 to 1000° C. in an oxidation atmosphere for about 3 to 100 hours.

The firing (the main firing) of the honeycomb formed body is performed to sinter and densify a forming raw material constituting the calcinated honeycomb formed body, thereby acquiring a predetermined strength. Firing conditions (temperature, time, atmosphere, etc.) vary with a type of forming raw material, and hence appropriate conditions may be selected in accordance with the type. For example, when the cordierite forming raw material is used, a firing temperature is preferably from 1410 to 1440° C. Furthermore, as the firing time, a highest temperature keeping time is preferably from 4 to 8 hours. There is not any special restriction on a device which performs the calcinating and the main firing, but an electric furnace, a gas furnace or the like can be used.

(2-2) Cutting Step;

The cutting step is a step of cutting the outer peripheral portion of the honeycomb fired body. There is not any special restriction on a method of cutting the honeycomb fired body. As the method of cutting the outer peripheral portion of the honeycomb fired body, a heretofore known method can appropriately be employed, but the method is preferably a technique of pressing a grindstone covered with diamond onto the honeycomb fired body while rotating the honeycomb fired body. A thickness of "the outer peripheral portion of the honeycomb fired body which is to be cut" in the cutting step is the same as a thickness of the bulging portion formed after the cutting.

When the honeycomb structure in which "the flat portion parallel to the Z-direction" is formed in the bulging portion is prepared as described above, the honeycomb fired body is preferably cut as follows. That is, the honeycomb fired body is preferably cut so that a part of the side surface of the polygonal columnar honeycomb fired body is left, and the left part of the side surface becomes the flat portion of the bulging portion. In this case, it is not necessary to perform the operation of forming the flat portion anew after the cutting.

It is to be noted that the cutting may be performed before or after the firing of the honeycomb formed body, but the cutting is preferably performed after the firing. The cutting is performed after the firing, whereby even when the honeycomb fired body is deformed by the firing, it is possible to regulate the shape of the honeycomb fired body by the cutting.

(2-3) Plugging Step;

When the honeycomb structure including the plugging portions is prepared, the following plugging step is preferably performed after the cutting step. In this plugging step, the plugging portions are disposed in the open ends of "the predetermined cells (the first cells)" in one end face (the first end face) and the open ends of "the residual cells (the second cells)" in the other end face (the second end face) of the honeycomb fired body. Hereinafter, the step will specifically be described.

First, a plugging material is charged into the cell open ends 18 of one end face (the first end face) of the honeycomb fired body (the honeycomb substrate). A method of charging the plugging material into the cell open ends of the one end face (the first end face) is preferably a method having a masking step and a press-in step. The masking step is a step of attaching a sheet to the one end face of the honeycomb fired body, and making holes at positions which overlap with "the cells in which the plugging portions are to be formed" in the sheet. The press-in step is a step of inserting, under pressure, "the end portion of the honeycomb fired body to which the sheet is attached" into a container where the plugging material is stored to press the plugging material into the cells of the honeycomb fired body. When the plugging material is pressed into the cells of the honeycomb fired body, the plugging material passes the holes formed in the sheet, and is charged only into the cells communicating with the holes formed in the sheet.

The plugging material can be prepared by appropriately mixing raw materials which are the examples of constituent elements of the above ceramic forming raw material. The ceramic raw material contained in the plugging material is preferably the same as the ceramic raw material for use as the raw material of the partition walls.

Next, the plugging material charged into the honeycomb fired body is preferably dried.

In the one end face (the first end face) of the honeycomb fired body, the cells in which the plugging portions are formed and the cells in which the plugging portions are not formed are preferably alternately arranged. In this case, in the one end face in which the plugging portions are formed, the checkered pattern is formed by the plugging portions and "the open ends of the cells".

Next, the plugging portions are preferably disposed in the open ends of "the residual cells (the second cells)" in the other end face (the second end face) of the honeycomb fired body in the same manner as in the one end face (the first end face). It is to be noted that the drying of the plugging material may be performed after the plugging material is charged into both the end faces of the honeycomb fired body. Furthermore, the firing step may be performed after the plugging material is charged into the honeycomb formed body.

(2-4) Outer Periphery Coating Layer Forming Step;

An outer periphery coating material is preferably applied to an outer periphery of the cut honeycomb fired body to form the outer periphery coating layer. When the outer periphery coating layer is formed, the bulging portion can be prevented from being chipped. The outer periphery coating material can be obtained, for example, by adding additives such as an organic binder, a resin balloon and a dispersant to an inorganic raw material such as inorganic fibers, colloidal silica, a clay or SiC particles etc., and adding water thereto, followed by the kneading. An example of a method of applying the outer periphery coating material is a method of coating "the cut honeycomb fired body" with the material by a rubber spatula or the like while rotating the body on a potter's wheel.

The stress relaxing portions can be formed by grinding the outer peripheral portion of the honeycomb fired body so that the bulging portion is formed, applying the outer periphery coating material to the ground outer peripheral portion, and then partially drying the vicinity of a bonded portion to the tapered portion of the bulging portion in the outer periphery of the honeycomb substrate rapidly with an industrial dryer or the like. As to another portion in which any stress relaxing portions are not formed, the outer periphery coating material may be dried by natural drying. A reason why the stress relaxing portion can be formed by the abovementioned rapid drying is that a temperature difference is made between the surface of the outer periphery coating material and an inner portion thereof by the rapid drying, and as a result, a difference of drying shrinkage is made therebetween. To regulate a width or a length of each stress relaxing portion, a rapid drying time, an object range, an amount of a water content in the outer periphery coating material or the like may be changed.

EXAMPLES

Hereinafter, the present invention will be described in more detail on the basis of examples, but the present invention is not limited to these examples.

Example 1

As a ceramic raw material, there was used a material obtained by mixing silicon carbide (SiC) powder and metal silicon (Si) powder. Then, hydroxypropyl methylcellulose as a binder and a pore former were added, and water was also added to prepare a forming raw material. Then, the forming raw material was kneaded by a vacuum pugmill, to prepare a kneaded material. A content of the binder was 7 parts by mass when a total of the silicon carbide (SiC) powder and the metal silicon (Si) powder was 100 parts by mass. A content of the pore former was 3 parts by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 20 μm, and an average particle diameter of the metal silicon powder was 6 μm. Furthermore, an average particle diameter of the pore former was 20 μm. The average particle diameters of silicon carbide powder, metal silicon powder and the pore former were values measured by a laser diffraction method.

The obtained kneaded material was formed by using an extrusion machine, to obtain a columnar honeycomb formed body. The obtained honeycomb formed body was subjected to high-frequency dielectric heating drying, and then dried at 120° C. for two hours by use of a hot air dryer.

The dried honeycomb formed body was degreased and fired to obtain a columnar honeycomb fired body. Degreasing conditions were 550° C. and 3 hours. Firing conditions were that the firing was performed at 1450° C. under an argon atmosphere for 2 hours.

Next, an outer peripheral portion of the obtained columnar honeycomb fired body was cut so that "a bulging portion was left in a ring shape in a central portion in a Z-direction". Afterward, an outer periphery coating material was applied to an outer periphery of the cut honeycomb fired body to form an outer periphery coating layer 7.

In the abovementioned step, the outer periphery coating material was applied, and then, in the vicinity of a bonded portion to a tapered shape of the bulging portion in an outer periphery of a honeycomb substrate, the outer periphery coating material was partially rapidly dried by an industrial dryer or the like, to form stress relaxing portions 17. As to the other portions in which the stress relaxing portions were not formed, the outer periphery coating material was dried by natural drying, so that the stress relaxing portions were not formed.

A honeycomb structure shown in FIG. 1 was obtained in this manner. A method of cutting the outer peripheral portion of the honeycomb fired body was a method of pressing a grindstone covered with diamond onto the outer peripheral portion of the honeycomb fired body at an angle of 35 degrees to the Z-direction while rotating the honeycomb fired body. In this way, there was obtained a honeycomb structure having the bulging portion in which both ends (both the ends in the Z-direction) had the tapered shape. Specifically, the flat portions were not formed in this honeycomb structure.

A bottom surface of the obtained honeycomb structure had a round shape with a diameter of 14.4 cm, and a length of the honeycomb structure in the Z-direction was 20.3 cm. Furthermore, a thickness of partition walls was 305 μm, and a cell density was 46.5 cells/cm². A thickness of the bulging portion (the bulging portion thickness) (H) was 10 mm, a width of the bulging portion (the bulging portion width) (L) was 20 mm, a ratio of the bulging portion width to the whole length of the honeycomb structure (the honeycomb substrate) was 10%, and a tilt angle was 35 degrees. The bulging portion was disposed at a position where a distance from one end portion of the honeycomb structure to an end of the bulging portion close to the above one end portion was 6.4 cm. A maximum thickness (H) of the bulging portion is a distance between "a line parallel to the outer periphery of the honeycomb substrate disposed to come in contact with the outer periphery of the bulging portion (but, excluding tapered portions)" and "the outer periphery of the honeycomb substrate" in a cross section parallel to the Z-direction of the honeycomb structure. The width (L) of the bulging portion is the length of the bulging portion in the Z-direction of the honeycomb structure.

In Table 1, a column of "a bulging portion attaching position" indicates the position where the bulging portion is disposed. "A center" indicates that the bulging portion is disposed in a central portion of the Z-direction of the honeycomb structure. "The end portion" indicates that the bulging portion is disposed in the end portion in the Z-direction of the honeycomb structure. "The tilt angle (degrees)" indicates an acute angle among angles made between each of tapered surfaces of both ends of the bulging portion and the Z-direction.

As to the obtained honeycomb structure, "a position of each stress relaxing portion", "a length of the stress relaxing portion", "a width of the stress relaxing portion", "a ring crack", "a bulging portion strength" and "mounting properties" were evaluated by the following methods, respectively. The results are shown in Table 1.

(Position, Length, and Width of Stress Relaxing Portion)

The position, length and width of the stress relaxing portion were measured by use of a ruler or slide calipers. As to the width of the stress relaxing portion, the stress relaxing portion having a width of 10 μm or more was specified by using a thickness gauge (JIS B 7524) of 10 μm.

(Ring Crack)

First, the honeycomb structure was attached to a burner test machine. Next, the following operation was carried out by this burner test machine. Specifically, the following temperature raising/cooling operation was one cycle. The temperature raising/cooling operation was an operation in which "a high temperature gas reaching 800° C. at a position of 20 mm before an inlet end face of the honeycomb structure was allowed to flow through the honeycomb structure at 2 Nm$^3$/min for 10 minutes, and then a cooling gas reaching 150° C. at a position of 20 mm before the inlet end face of the honeycomb structure was allowed to flow through the honeycomb structure at 2 Nm$^3$/min for 10 minutes". Then, the temperature raising/cooling operations were performed for 100 cycles. Afterward, the presence of the ring crack formed in the honeycomb structure was visually confirmed, and evaluated in accordance with the following standards. When the ring crack is generated in the honeycomb structure to such an extent that a function of a DPF is deteriorated, the evaluation is "C". When the ring crack is generated in the honeycomb structure to such an extent that the function of the DPF is not deteriorated, the evaluation is "B". When the ring crack is not generated in the honeycomb structure, the evaluation is "A". "A" and "B" pass, and "C" fails. It is to be noted that as to "the function of the DPF", when a PM (soot) trapping efficiency in a treatment (an exhaust gas treatment by the DPF) is 90% or more, it can be considered that the ring crack is generated "to such an extent that the function of the DPF is not deteriorated". Furthermore, when the PM (soot) trapping efficiency is smaller than 90%, it is considered that the ring crack is generated "to such an extent that the function of the DPF is deteriorated". In the measurement of the PM (soot) trapping efficiency, as described in the following, the PM (soot) included in the gas passed through the honeycomb structure was trapped by filter paper, and a weight (W1) of the PM (soot) was measured. Specifically, the honeycomb structure was attached to a soot generator which generated the PM (soot) by a burner in which a diesel oil was a fuel. Afterward, in the honeycomb structure attached to the soot generator, there was passed a gas in which PM (soot) was generated by the soot generator and which reached 200° C. at a position of 190 mm before the inlet end face of the honeycomb structure, at 3 Nm$^3$/min for 2 minutes. In this manner, the weight (W1) was measured. Furthermore, the gas in which the PM (soot) was generated for the same period of time was not passed through the honeycomb structure, but was trapped by filter paper, and a weight (W2) of the PM (soot) was measured. Next, the respective obtained weights (W1) and (W2) were substituted into the following formula to obtain the trapping efficiency.

(W2−W1)/(W2)×100

(Bulging Portion Strength)

First, there was prepared a pendulum having a string (a length of 75 cm) including, at a tip thereof, an iron ball having a diameter of 11 mm (a weight of 5.4 g). Next, this pendulum was disposed so that at the lowermost point of the iron ball (i.e., in a state where the pendulum was not swung), the iron ball hit the end (the outermost circumference portion) of the bulging portion of the honeycomb structure. Next, the iron ball of the pendulum was swung upward so that the iron ball collided with the end of the bulging portion. Afterward, the end of the bulging portion was visually observed. Then, evaluation was performed in accordance with the following standards. When the iron ball is swung upward to a height of 80% of a length of the string so that the iron ball collides with the end of the bulging portion, a defect such as a chip is generated in the end of the bulging portion. In this case, the evaluation is "C". When the iron ball is swung upward to a height of 100% of the length of the string so that the iron ball collides with the end of the ring-like bulging portion, a defect such as a chip is generated in the end of the bulging portion. In this case, the evaluation is "B". In a case where any defect is not generated at this time, the evaluation is "A". The evaluations "A" and "B" pass, and evaluation "C" fails.

(Mounting Properties)

As to the honeycomb structures (Examples 1 to 17 and Comparative Examples 2 to 8) having the bulging portions in which the flat portions are not formed and the honeycomb structure (Comparative Example 1) in which the bulging portion is not formed, mounting properties were evaluated by a maximum thickness (H) and a width (L) of the bulging portion. The evaluation as to the maximum thickness (H) of the bulging portion is referred to as "the evaluation of 'a diametric direction'" sometimes. Furthermore, the evaluation as to the width (L) of the bulging portion is referred to as "the evaluation of 'the whole length direction'" sometimes. The evaluation as to the maximum thickness (H) of the bulging portion is as follows. When the maximum thickness of the bulging portion is 10 mm or less, the evaluation is "A", and when the maximum thickness is in excess of 10 mm and 20 mm or less, the evaluation is "B". When the maximum thickness is in excess of 20 mm, the evaluation is "C". The evaluation as to the width (L) of the bulging portion is as follows. When the width of the bulging portion is in excess of 80% of the length of the honeycomb structure in the cell extending direction, the evaluation is "B", and when the width is 80% or less of the length of the honeycomb structure in the cell extending direction, the evaluation is "A". In the case of "B", the mounting properties of the honeycomb structure are affected. In the case of "A", the mounting properties of the honeycomb structure are not affected.

Furthermore, as to the mounting properties, general evaluation is carried out in consideration of all of the maximum thickness (H), the width (L) and an angle (α) of the bulging portion. When both of "the evaluation of the diametric direction" and "the evaluation of the whole length direction" are "A", the general evaluation is "A". When at least one of "the evaluation of the diametric direction" and "the evaluation of the whole length direction" is "B", the general evaluation is "B". When "the evaluation of the diametric direction" is "C", the general evaluation is "C". In the general evaluation of the mounting properties, the evaluations "A" and "B" pass, and the evaluation "C" fails. Furthermore, the evaluation "A" is most preferable, and the evaluation "B" is next preferable. Furthermore, the evaluation "C" is the poorest evaluation in these evaluations A, B and C. It is to be noted that the honeycomb structure of Comparative Example 1 is the honeycomb structure in which the thickness of the bulging portion is "0 mm". The results are shown in Table 1.

As to the honeycomb structures (Examples 18 and 19) each having the bulging portion in which the flat portion is formed, evaluation is carried out as follows (an effect of the flat portion). First, there is assumed an outer tube in which a shape in a cross section perpendicular to a central axis of the honeycomb structure provided with the flat portion (hereinafter referred to as "the honeycomb structure X" sometimes) is analogous to a shape of the honeycomb structure X and a space between the outer tube and the honeycomb structure X is uniformly 5 mm. Next, in a cross section perpendicular to a central axis of this outer tube, there are drawn a line segment a passing through the center of the outer tube and connecting two points of an outer peripheral portion of the outer tube, a line segment b perpendicular to the line segment a, and a line segment c tilted as much as 45° to the line segment a. Each of the line segments b and c is the line segment passing through the center of the outer tube and connecting the two points of the outer peripheral portion of the outer tube. It is assumed that the line segments a and b are perpendicular to a flat surface formed in the outer tube. Next, a total of the line segments a, b and c is calculated. Next, there is assumed a honeycomb structure (hereinafter referred to as "a honeycomb structure Y" sometimes) which does not have the bulging portion in the honeycomb structure X. Next, in the same manner as in the honeycomb structure X, there is assumed an outer tube which has a shape analogous to that of the honeycomb structure Y and in which a space between the outer tube and the honeycomb structure Y is uniformly 5 mm. Next, in the same manner as in corresponding honeycomb structure X, line segments a, b and c are drawn. Next, a total of the line segments a, b and c is calculated. Afterward, evaluation is carried out in accordance with the following standards. When a ratio of "the total of the line segments a, b and c" calculated in the case of the honeycomb structure X to "the total of the line segments a, b and c" calculated in the case of the honeycomb structure Y is 104% or less, the evaluation is "A". When the ratio of "the total of the line segments a, b and c" calculated in the case of the honeycomb structure X to "the total of the line segments a, b and c" calculated in the case of the honeycomb structure Y is 106% or less, the evaluation is "B". When the ratio of "the total of the line segments a, b and c" calculated in the case of the honeycomb structure X to "the total of the line segments a, b and c" calculated in the case of the honeycomb structure Y is larger than 106%, the evaluation is "C". It is to be noted that the above evaluation as to the honeycomb structure having the bulging portion in which the flat portion is formed corresponds to "the evaluation of the diametric direction". Furthermore, as to the honeycomb structure having the bulging portion in which the flat portion is formed, "the evaluation of the whole length direction" and "the general evaluation" are carried out in the same manner as in the honeycomb structure having the bulging portion in which the flat portion is not formed. The results are shown in Table 1.

TABLE 1

| | Bulging portion attaching position | Bulging portion Tilt angle [degree] | Bulging portion max. thickness (H) [mm] | Bulging portion width (L) [mm] | Ratio to whole length*1 | Flat portion depth (D) [mm] | Presence of stress relaxing portion in region of −5 to +10 mm from reference bonded portion with tapered surface | Total of lengths of stress relaxing portions [mm] | Ratio to circumferential length [%]*2 |
|---|---|---|---|---|---|---|---|---|---|
| Example 1 | Center | 35 | 10 | 20 | 10% | — | Present | 15 | 3.3% |
| Example 2 | Center | 35 | 10 | 20 | 10% | — | Present | 42 | 9.3% |
| Example 3 | Center | 35 | 10 | 20 | 10% | — | Present | 46 | 10.2% |
| Example 4 | Center | 35 | 10 | 20 | 10% | — | Present | 383 | 84.7% |
| Example 5 | Center | 35 | 10 | 20 | 10% | — | Present | 41 | 9.1% |
| Example 6 | Center | 35 | 10 | 20 | 10% | — | Present | 42 | 9.3% |
| Example 7 | Center | 35 | 1 | 20 | 10% | — | Present | 16 | 3.5% |
| Example 8 | Center | 35 | 20 | 20 | 10% | — | Present | 18 | 4.0% |
| Example 9 | Center | 35 | 10 | 3 | 1% | — | Present | 17 | 3.8% |
| Example 10 | Center | 35 | 10 | 160 | 79% | — | Present | 17 | 3.8% |
| Example 11 | Center | 35 | 10 | 165 | 81% | — | Present | 37 | 8.2% |
| Example 12 | Center | 8 | 10 | 20 | 10% | — | Present | 24 | 5.3% |
| Example 13 | Center | 11 | 10 | 20 | 10% | — | Present | 19 | 4.2% |
| Example 14 | Center | 80 | 10 | 20 | 10% | — | Present | 33 | 7.3% |
| Example 15 | End portion | 35 | 10 | 20 | 10% | — | Present | 40 | 8.8% |
| Example 16 | End portion | 35 | 10 | 20 | 10% | — | Present | 169 | 37.4% |
| Example 17 | End portion | 60 | 1 | 15 | 7% | — | Present | 38 | 8.4% |
| Example 18 | Center | 35 | 10 | 20 | 10% | 10 | Present | 15 | 3.3% |
| Example 19 | Center | 35 | 20 | 20 | 10% | 20 | Present | 20 | 4.4% |
| Comparative Example 1 | — | — | — | — | — | — | — | — | — |
| Comparative Example 2 | Center | 35 | 10 | 20 | 10% | — | None | 0 | 0 |
| Comparative Example 3 | Center | 35 | 10 | 20 | 10% | — | Present | 12 | 2.7% |
| Comparative Example 4 | Center | 35 | 10 | 20 | 10% | — | None | 62 | 13.7% |
| Comparative Example 5 | Center | 35 | 0.5 | 20 | 10% | — | Present | 52 | 11.5% |
| Comparative Example 6 | Center | 35 | 21 | 20 | 10% | — | Present | 37 | 8.2% |
| Comparative Example 7 | Center | 35 | 10 | 1 | 0.5% | — | Present | 66 | 14.6% |
| Comparative Example 8 | Center | 85 | 10 | 20 | 10% | — | Present | 26 | 5.7% |

TABLE 1-continued

| | Total of lengths of stress relaxing portions each having width of 5 μm or more | | Total of lengths of stress relaxing portions present in region of −5 to +10 mm from reference bonded portion with tapered surface | | Ring crack | Bulging portion strength | Mounting properties | | | Judgment |
|---|---|---|---|---|---|---|---|---|---|---|
| | [mm] | Ratio [%]*3 | [mm] | Ratio [%]*4 | | | Diametric direction | Whole length direction | General | |
| Example 1 | 7 | 46.7% | 4 | 26.7% | B | B | A | A | A | ○ |
| Example 2 | 18 | 42.9% | 16 | 38.1% | B | B | A | A | A | ○ |
| Example 3 | 19 | 41.3% | 16 | 34.8% | A | B | A | A | A | ◎ |
| Example 4 | 312 | 81.5% | 201 | 52.5% | A | B | A | A | A | ◎ |
| Example 5 | 22 | 53.7% | 10 | 24.4% | A | B | A | A | A | ◎ |
| Example 6 | 7 | 46.7% | 18 | 42.9% | A | B | A | A | A | ◎ |
| Example 7 | 6 | 37.5% | 4 | 25.0% | B | A | A | A | A | ○ |
| Example 8 | 7 | 38.9% | 5 | 27.8% | B | B | B | A | B | ○ |
| Example 9 | 5 | 29.4% | 4 | 23.5% | B | B | A | A | A | ○ |
| Example 10 | 8 | 47.1% | 6 | 35.3% | B | A | A | A | A | ○ |
| Example 11 | 20 | 54.1% | 12 | 32.4% | A | A | A | B | B | ○ |
| Example 12 | 9 | 37.5% | 7 | 29.2% | B | A | A | B | B | ○ |
| Example 13 | 5 | 26.3% | 5 | 26.3% | B | A | A | A | A | ○ |
| Example 14 | 19 | 57.6% | 11 | 33.3% | A | B | A | A | A | ◎ |
| Example 15 | 11 | 27.5% | 12 | 30.0% | B | B | A | A | A | ○ |
| Example 16 | 35 | 20.7% | 49 | 29.0% | A | B | A | A | A | ◎ |
| Example 17 | 13 | 34.2% | 12 | 31.6% | B | A | A | A | A | ○ |
| Example 18 | 7 | 46.7% | 4 | 26.7% | B | B | A | A | A | ○ |
| Example 19 | 8 | 40.0% | 6 | 30.0% | B | B | B | A | B | ○ |
| Comparative Example 1 | — | — | — | — | C | — | A | A | A | X |
| Comparative Example 2 | 0 | 0% | 0 | 0% | C | B | A | A | A | X |
| Comparative Example 3 | 7 | 58.3% | 7 | 58.3% | C | B | A | A | A | X |
| Comparative Example 4 | 23 | 37.1% | 20 | 32.3% | C | B | A | A | A | X |
| Comparative Example 5 | 27 | 51.9% | 25 | 48.1% | C | A | A | A | A | X |
| Comparative Example 6 | 20 | 54.1% | 12 | 32.4% | A | B | C | A | C | X |
| Comparative Example 7 | 15 | 22.7% | 13 | 19.7% | C | B | A | A | A | X |
| Comparative Example 8 | 8 | 30.8% | 6 | 23.1% | B | C | A | A | A | X |

*1Ratio (%) of the bulging portion width (L) to the whole length of the honeycomb structure (the honeycomb substrate)
*2Ratio (%) of the total of the lengths of all the stress relaxing portions to the circumferential length of the honeycomb structure (the honeycomb substrate)
*3Ratio (%) of the lengths of the stress relaxing portions each having a width of 5 μm or more to the total of the lengths of all the stress relaxing portions
*4Ratio (%) of the lengths of the stress relaxing portions present in the region of −5 to +10 mm from the reference contact portion with the tapered surface to the total of the lengths of all the stress relaxing portions Examples 2 to 17 and Comparative Examples 1 to 8

The procedures of Example 1 were repeated except that conditions were changed as shown in Table 1, to obtain honeycomb structures. As to the obtained honeycomb structures, "a position of each stress relaxing portion", "a length of the stress relaxing portion", "a width of the stress relaxing portion", "a holding surface pressure", "a ring crack", "a bulging portion strength" and "mounting properties" were evaluated by the above methods, respectively. The results are shown in Table 1.

Example 18

A kneaded material was obtained in the same manner as in Example 1. The obtained kneaded material was formed by using an extrusion machine to obtain a quadrangular columnar honeycomb formed body. The obtained honeycomb formed body was subjected to high-frequency dielectric heating drying, and then dried at 120° C. for 2 hours by use of a hot air dryer.

The dried honeycomb formed body was degreased and fired to obtain a quadrangular columnar honeycomb fired body. Degreasing conditions were that the degreasing was performed at 550° C. for 3 hours. Firing conditions were that the firing was performed at 1450° C. under an argon atmosphere for 2 hours.

An outer peripheral portion of the obtained quadrangular columnar honeycomb fired body was cut "so that a bulging portion having a ring shape was formed, and a part of each side surface of the honeycomb fired body was left as a flat portion formed on the bulging portion of the ring shape". The bulging portion of the ring shape was formed in "a central portion in a Z-direction" of the honeycomb fired body. Afterward, an outer periphery coating material was applied to an outer periphery of the cut honeycomb fired body to form an outer periphery coating layer. In this way, such a honeycomb structure as shown in FIG. 4 was obtained. As a method of cutting the outer peripheral portion of the honeycomb fired body, there was used a method of pressing a grindstone covered with diamond onto the outer peripheral portion of the honeycomb fired body at an angle of 35 degrees in the Z-direction while rotating the honeycomb fired body. In this way, there was obtained the honeycomb structure having the bulging portion in which "four flat portions were formed, and both ends were tapered". An angle ("a tilt angle") of the taper of the bulging portion in this honeycomb structure was 35 degrees at each of the ends. In the bulging portion of the honeycomb structure of the present example, two pairs of flat portions parallel to each other (four flat portions in total) were formed as shown in FIG. 4.

A bottom surface of the obtained honeycomb structure had a round shape with a diameter of 14.4 cm, and a length of the honeycomb structure in the Z-direction was 20.3 cm. Furthermore, a thickness of partition walls was 305 μm, and a cell density was 46.5 cells/cm². A thickness (H) of the bulging portion was 20 mm, a width (L) of the bulging portion was 20 mm, a ratio of the bulging portion width to the whole length of the honeycomb structure (a honeycomb substrate) was 10%, and a tilt angle was 35 degrees. A flat portion depth (D) (four portions) was 10 mm. It is to be noted that "the flat portion depth (D)" is a difference between the thickness (H) of the bulging portion and "a distance T from the flat portion (the surface) to the outer periphery of the honeycomb substrate" (see FIG. 5). The bulging portion was disposed at a position where "a distance from one end portion of the honeycomb structure to the end of the bulging portion which was close to this one end portion" was 6.4 cm.

As to the obtained honeycomb structure, "a position of each stress relaxing portion", "a length of the stress relaxing portion", "a width of the stress relaxing portion", "a ring crack", "a bulging portion strength" and "mounting properties" were evaluated by the above methods, respectively. The results are shown in Table 1.

Example 19

The procedures of Example 18 were repeated except that conditions were changed as shown in Table 1, to prepare a honeycomb structure. As to the obtained honeycomb structure, "a position of each stress relaxing portion", "a length of the stress relaxing portion", "a width of the stress relaxing portion", "a ring crack", "a bulging portion strength" and "mounting properties" were evaluated by the above methods, respectively. The results are shown in Table 1.

(Judgment)

When "the ring crack" and "the general evaluation of the mounting properties" were A and "the bulging portion strength" was A or B, it was judged that the result was "good" (displayed with a double circle in Table 1). When one of "the ring crack" and "the general evaluation of the mounting properties" was B, the other was A or B and "the bulging portion strength" was A or B, it was judged that the result was "passable" (displayed with a circle mark in Table 1). When any one of "the ring crack", "the general evaluation of the mounting properties" and "the bulging portion strength" was C, it was judged that the result was "non-passable" (displayed with a cross mark in Table 1).

From Table 1, in the honeycomb structures of Examples 1 to 19, the judgment results were "good" or "passable". On the other hand, in the honeycomb structures of Comparative Examples 1 to 8, the judgment results were "non-passable".

The honeycomb structure of the present invention can suitably be utilized as a filter to purify a gas discharged from an internal combustion engine such as a diesel engine or a direct injection type gasoline engine, each type of burning device or the like.

Description of Reference Numerals

1: partition wall, 2: cell, 2a: first cell, 2b: second cell, 3: first end face, 4: honeycomb substrate, 5: second end face, 7: outer periphery coating layer, 10: bulging portion, 11: tapered surface, 13: bonded portion, 15: flat portion, 17: stress relaxing portion, 18: open end of the stress relaxing portion, 20: package container, 23: plugging portion, 25: open end of the cell, 50: ring crack, 100, 100a to 100d: honeycomb structure, and 200: honeycomb structure.

What is claimed is:

1. A honeycomb structure comprising:
 a honeycomb substrate having porous partition walls defining a plurality of cells extending from a first end face as one end face to a second end face as the other end face to become through channels for a fluid; and
 a bulging portion continuously or intermittently surrounding, in a ring shape, at least a part of an outer periphery of the honeycomb substrate,
 wherein the bulging portion is disposed to project outwardly from the outer periphery of the honeycomb substrate and to cover only a part of the outer periphery of the honeycomb substrate,
 a shape of at least one end of the bulging portion is a tapered shape having a tapered surface which is a surface tilted to a bonded portion to the outer periphery,
 in a cross section perpendicular to an extending direction of the cells, a maximum thickness of the bulging portion is from 1 to 20 mm,
 in a cross section parallel to the cell extending direction, a width of the bulging portion is 1% or more of the whole length of the honeycomb substrate, and a tilt angle which is an angle made between the tapered surface and the cell extending direction is 80 degrees or less,
 the outer periphery of the honeycomb substrate has one or a plurality of stress relaxing portions which are crevices each having an open end in the surface over a region of −5 to +10 mm or less from the bonded portion to the tapered surface with the bonded portion used as a reference for measurement, and
 a total of lengths of all the stress relaxing portions is 3% or more of a circumferential length of the honeycomb substrate.

2. The honeycomb structure according to claim 1, wherein the total of the lengths of all the stress relaxing portions is 10% or more of the circumferential length of the honeycomb substrate.

3. The honeycomb structure according to claim 1, wherein the total of the lengths of the stress relaxing portions, in each of which a width of the open end is 10 μm or more, is 50% or more of the total of the lengths of all the stress relaxing portions.

4. The honeycomb structure according to claim 1, wherein the stress relaxing portions of 40% or more of the total of the lengths of all the stress relaxing portions are present in the region of −5 to +10 mm or less from the bonded portion to the tapered surface with the bonded portion used as the reference for measurement.

5. The honeycomb structure according to claim 1, wherein in the cross section parallel to the cell extending direction, the width of the bulging portion is from 1 to 80% of the whole length of the honeycomb substrate, and the tilt angle is from 10 to 80 degrees.

6. The honeycomb structure according to claim 1, wherein a part of the surface of the bulging portion is a flat portion which is a flat surface parallel to the cell extending direction.

7. The honeycomb structure according to claim 1, wherein the honeycomb substrate is made of at least one selected from the group consisting of cordierite, silicon carbide, mullite, aluminum titanate, and alumina.

8. The honeycomb structure according to claim 1, further comprising:
plugging portions which plug an open end on the side of the first end face of a first cell as each of predetermined cells of the plurality of cells and an open end on the side of the second end face of a second cell as each of the residual cells of the plurality of cells, wherein each of the plurality of cells is one of a predetermined cell and a residual cell, and wherein an open end of each predetermined cell is plugged with a plugging portion on the first end face and an open end of each residual cell is plugged with a plugged portion on the second end face of the honeycomb structure.

9. The honeycomb structure according to claim 1, wherein the bulging portion has alternating rounded and flat portions that surround the honeycomb substrate.

* * * * *